US012483159B2

(12) United States Patent
Rosado et al.

(10) Patent No.: US 12,483,159 B2
(45) Date of Patent: Nov. 25, 2025

(54) CONTROLLER FOR CONTROLLING A BALANCER CIRCUIT

(71) Applicant: HUAWEI TECHNOLOGIES CO., LTD., Shenzhen (CN)

(72) Inventors: Sebastian Pedro Rosado, Nuremberg (DE); Zhaohui Wang, Shenzhen (CN); Francisco Daniel Freijedo Fernández, Nuremberg (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 196 days.

(21) Appl. No.: 18/523,588

(22) Filed: Nov. 29, 2023

(65) Prior Publication Data
US 2024/0097550 A1 Mar. 21, 2024

Related U.S. Application Data

(63) Continuation of application No. PCT/EP2021/082422, filed on Nov. 22, 2021.

(51) Int. Cl.
*H02M 7/487* (2007.01)
*H02M 1/00* (2006.01)
*H02M 7/483* (2007.01)

(52) U.S. Cl.
CPC ......... *H02M 7/487* (2013.01); *H02M 1/0003* (2021.05); *H02M 1/0012* (2021.05); *H02M 1/0022* (2021.05); *H02M 7/483* (2013.01)

(58) Field of Classification Search
CPC ............. H02M 1/0003; H02M 1/0012; H02M 1/0022; H02M 7/487; H02M 7/483
See application file for complete search history.

(56) References Cited

U.S. PATENT DOCUMENTS 10,516,365 B1 * 12/2019 Serban ................. H02M 7/487
12,323,073 B2 * 6/2025 Tsoumas ................ H02M 7/49
(Continued)

FOREIGN PATENT DOCUMENTS

| CN | 102355142 A | 2/2012 |
| CN | 104253554 A | 12/2014 |

(Continued)

OTHER PUBLICATIONS

Umbria et al, "Voltage balancing in three-level neutral-point-clamped converters via Luenberger observer", Control Engineering Practice, vol. 25, pp. 36-44 (Jan. 11, 2014).

(Continued)

*Primary Examiner* — Yusef A Ahmed
(74) *Attorney, Agent, or Firm* — Leydig, Voit & Mayer, Ltd.

(57) ABSTRACT

A controller controls a balancer circuit, and is configured to: determine a difference value between a first DC link voltage value across a first DC link of a power converter and a second DC link voltage value across a second DC link of the power converter; determine a phase-angle and a magnitude of the difference value for an integer harmonic of a predetermined grid frequency; and provide a switching signal for switching between the first DC link and the second DC link based on the phase-angle and the magnitude. The controller is also configured to control a mid-point current at a mid-point terminal of the power converter in terms of magnitude and direction based on the switching signal.

15 Claims, 10 Drawing Sheets

(56) References Cited

U.S. PATENT DOCUMENTS

| | | | | |
|---|---|---|---|---|
| 2002/0172058 A1* | 11/2002 | Szczesny | | H02M 7/487 |
| | | | | 363/40 |
| 2008/0316779 A1* | 12/2008 | Jayaraman | | H02M 3/156 |
| | | | | 363/89 |
| 2009/0160254 A1* | 6/2009 | Wu | | H02M 1/4208 |
| | | | | 307/64 |
| 2011/0134672 A1* | 6/2011 | Sato | | H02M 1/10 |
| | | | | 363/126 |
| 2012/0281442 A1* | 11/2012 | Revelant | | H02M 7/487 |
| | | | | 363/40 |
| 2014/0036555 A1* | 2/2014 | Kolhatkar | | H02J 9/062 |
| | | | | 363/56.01 |
| 2015/0131349 A1* | 5/2015 | El-Barbari | | H02J 3/36 |
| | | | | 363/131 |
| 2016/0276919 A1* | 9/2016 | Geyer | | H02M 1/08 |
| 2018/0062537 A1* | 3/2018 | Wang | | H02M 1/08 |
| 2020/0251981 A1* | 8/2020 | Thompson | | H02M 1/32 |
| 2020/0295668 A1* | 9/2020 | Bortis | | H02M 1/12 |
| 2021/0083597 A1* | 3/2021 | Hayashi | | H02M 7/4837 |
| 2021/0273551 A1* | 9/2021 | Zhang | | H02M 7/53876 |
| 2023/0071003 A1* | 3/2023 | Zhou | | H02M 7/219 |
| 2023/0223886 A1* | 7/2023 | Abarzadeh | | H02M 7/5395 |
| | | | | 318/504 |
| 2023/0238896 A1* | 7/2023 | Xu | | H02M 7/53871 |
| | | | | 307/84 |
| 2024/0204650 A1* | 6/2024 | Tsoumas | | H02J 3/36 |
| 2024/0266972 A1* | 8/2024 | Rosado | | H02J 1/08 |
| 2024/0305218 A1* | 9/2024 | Chen | | H02M 1/123 |
| 2024/0333124 A1* | 10/2024 | Rosado | | H02M 3/07 |
| 2024/0348152 A1* | 10/2024 | Qin | | H02M 7/487 |
| 2025/0023487 A1* | 1/2025 | Michalczuk | | H02M 7/487 |
| 2025/0047213 A1* | 2/2025 | Darivianakis | | H02M 7/487 |

FOREIGN PATENT DOCUMENTS

| | | |
|---|---|---|
| CN | 105490572 A | 4/2016 |
| CN | 110768237 A | 2/2020 |
| CN | 110912435 A | 3/2020 |
| JP | H09182455 A | 7/1997 |
| WO | 2020026430 A1 | 2/2020 |

OTHER PUBLICATIONS

Annette Von Jouanne et al., "A Multilevel Inverter Approach Providing DC-Link Balancing, Ride-Through Enhancement, and Common-Mode Voltage Elimination," IEEE Transactions on Industrial Electronics, vol. 49, No. 4, total 7 pages, Institute of Electrical and Electronics Engineers, New York, New York (Aug. 2002).

* cited by examiner

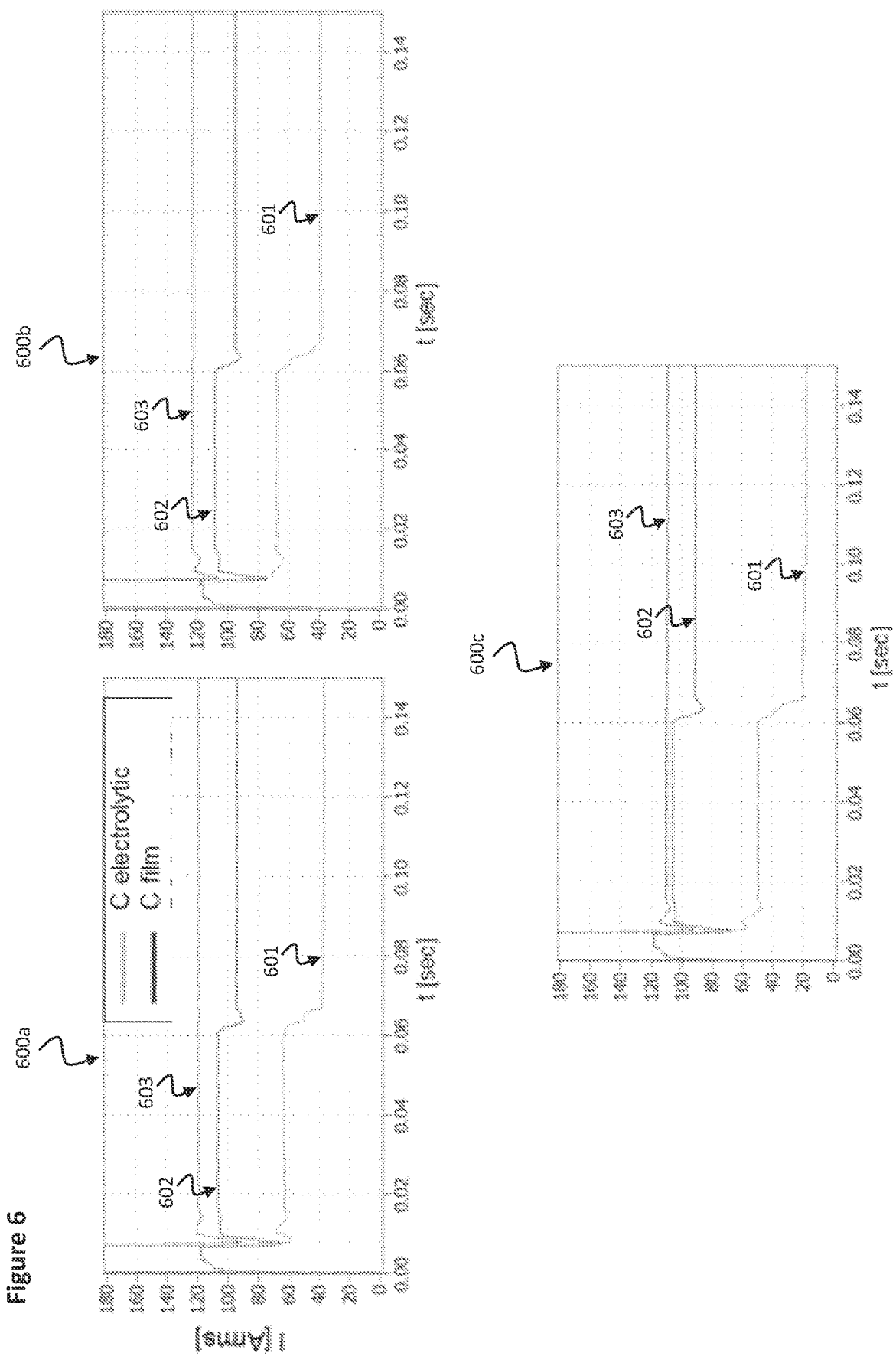

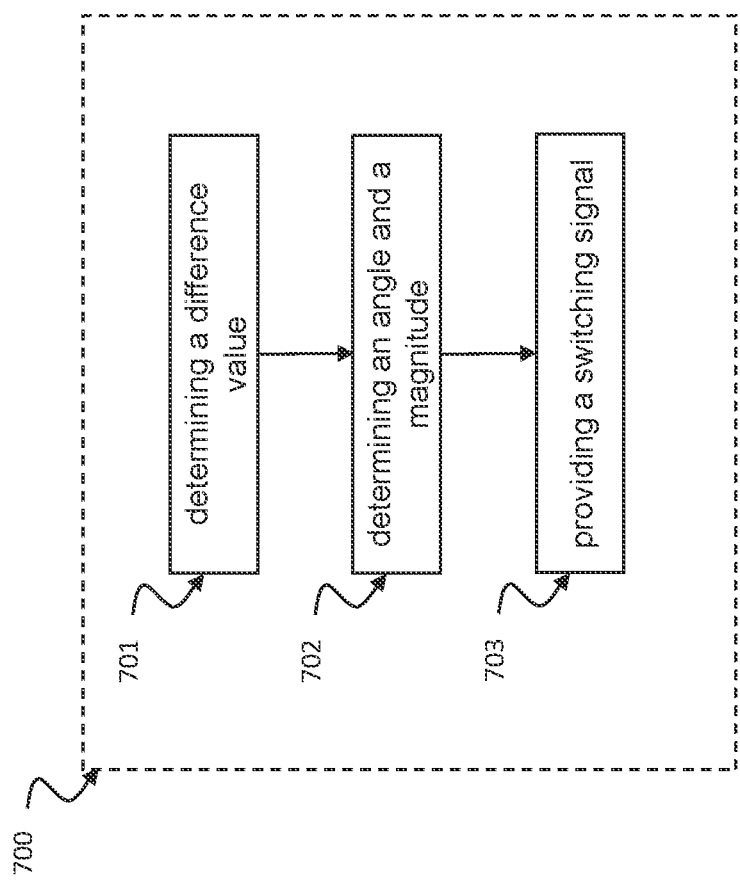

CONTROLLER FOR CONTROLLING A BALANCER CIRCUIT

CROSS-REFERENCE TO RELATED APPLICATIONS

This application is a continuation of International Application No. PCT/EP2021/082422, filed on Nov. 22, 2021, the disclosure of which is hereby incorporated by reference in its entirety.

FIELD

The disclosure relates to the field of photovoltaics (PV) and solar inverters, i.e., power inverters, for PV applications and in general to applications using multilevel DC/AC converters. In particular, the disclosure relates to a balancer circuit for balancing the DC voltages in a multilevel power converter and a controller for controlling the balancer circuit. The disclosure particularly relates to a method for neutral point balancer (NPB) circuit.

BACKGROUND

Photovoltaic power converter systems include three-phase DC/AC inverters based on multi-level circuit topologies of various types. In this type of power converter, the DC voltage is the sum of several DC-link voltages. The potential of the intermediate point (also called mid-point) between DC-links will experience some variation (periodic oscillation) that is dependent on the circuit, modulation type, and operation condition. Such voltage oscillations are undesirable because they increase the stress on the DC link capacitors and, in case they become large, they can introduce perturbation on the converter operation.

SUMMARY

Aspects of the present disclosure provide an efficient control scheme and a respective controller for efficiently controlling a balancer circuit.

Aspects of the present disclosure provide a controller and a control method for controlling a balancer circuit that enables regulating the degree of unbalance according to the need.

The disclosure introduces a new controller and a new control method to operate a mid-point balancer circuit in a multilevel power converter. Such balancer circuits can be used in multilevel converters, in order to keep the voltage among the various sections of the DC-link at a constant and equal value among them. The mid-point balancer is a power converter circuit that transfers charge between the partial DC-links capacitors to keep them balanced (i.e., the average voltage across each of the capacitors is the same). The disclosed controller and control method operate the circuit balancer in a way such that the power conversion capacity is optimized in terms of keeping the DC voltages balanced. Therefore, the controller and the control method enable higher levels of power density in terms of the balancer size and also the amount of capacitors (i.e., physical devices) required in the DC-links. The disclosed concept can be used in multilevel converters used in applications such as electrical drives, uninterruptible power supplies (UPS), electric vehicle (EV) charging, or similar.

The disclosure presents a new controller and a new control method for balancing the mid-point in the DC-link of a multilevel power converter. The disclosure targets the solar inverter for PV application. However, similar solution can be used for other applications using multilevel DC/AC converters.

The new control method and the associated controller presented hereinafter can be applied to a multilevel converter to reduce the oscillations in the partial DC-links. The control method described hereinafter provides the following advantages:

The control method provides a controlled, consistent reduction of the DC-link midpoint voltage oscillation across the wide operation range.

The control method utilizes the NPB circuit in such a way that for a given power handling capacity it minimizes the mid-point voltage oscillations and the associated effects, e.g., the root-mean-square (RMS) current value through the DC-link capacitors.

The control method reduces, and eventually stops, the action by the NPB at low power conversion levels of the main inverter, in order to minimize the impact on the overall power conversion efficiency.

In case of being used in DC-link configurations with split capacitors the control method produces a major benefit in the low frequency capacitor, keeping a consistent reduction of the RMS current across the operating range.

The control method is not limited to a specific balancer circuit topology, buck-boost is used here just as an example. The control method can be applied to various types of NPB circuits.

The control method is also not limited to a specific modulation method, e.g., DPWM1, and can be applied to other types of modulation schemes that produce DC-link voltage oscillations.

The control method can be applied to interleaved DC/AC inverters or DC-links where multiple converters are connected.

The control method provides an efficient and low-complex control algorithm whose core concept is based on the detection of the dc-link voltage oscillation.

The control method provides a robust control characteristic, i.e., not sensible to system or circuit parameter values.

In order to describe the disclosure in detail, the following terms, abbreviations and notations will be used:
PV photo-voltaic
DC direct current
AC alternating current
PWM Pulse Width Modulation
DPWM Discontinuous Pulse Width Modulation
NPB Neutral Point Balancer
UPS Uninterruptible Power Supply
EV Electric Vehicle In this disclosure, converters, i.e., power converters are described. Power converters, also referred to as power electronics converters, are applied for converting electric energy from one form to another, such as converting between DC and AC or AC and DC or between DC and DC, e.g., between low voltage DC and high or medium voltage DC. Power converter can also change the voltage or frequency or some combination of these. Power electronics converters are based on power electronics switches that can be actively controlled by applying ON/OFF logic (i.e., PWM operation, usually commanded by a closed loop control algorithm).

In this disclosure, balancer circuits are described. A balancer circuit is used in a multilevel power converter to keep the voltage among the various sections of the DC-link at a constant and equal value among them. The mid-point balancer is a power converter circuit that transfers charge between the partial DC-links capacitors to keep them balanced. The principle of operation for this balancer circuit is by transferring instantaneous power between the different sections of the DC-link. This power transfer reflects in the energy stored at the DC-link capacitors, i.e., the capacitor charge, which reflects on the capacitor voltage. By properly transferring charge among the DC-link sections the balancer circuit can reduce the oscillation of the intermediate points, also referred to as mid-points, of the power converter and achieve a good mid-point balance. This disclosure focuses on AC-DC applications, despite some aspects of the balancer can be modelled as DC-DC converters.

According to a first aspect, the disclosure relates to a controller for controlling a balancer circuit, wherein the controller is configured to: determine a difference value between a first Direct Current, DC, link voltage value across a first DC link of a power converter and a second DC link voltage value across a second DC link of the power converter; determine a phase-angle and a magnitude of the difference value for an integer harmonic of a predetermined grid frequency; and provide a switching signal for switching between the first DC link and the second DC link based on the phase-angle and the magnitude, wherein the controller is configured to control a mid-point current at a mid-point terminal of the power converter in terms of magnitude and direction based on the switching signal.

Such a controller provides the advantage of an efficient control scheme for efficiently controlling the balancer circuit, in particular a control scheme that enables regulating the degree of unbalance according to the specific needs, to be more specific: to a minimum allowable unbalance, which will depend on the design.

The first DC link voltage value can be obtained by sensing the DC bus voltage of first DC link and transmitting the sensed voltage, after sampling by an ADC, to the controller.

The second DC link voltage value is obtained by sensing the DC bus voltage of second DC link and transmitting the sensed voltage, after sampling by an ADC, to the controller.

The controller may provide the switching signal to the balancer circuit.

In an exemplary implementation of the controller, the controller is configured to determine the phase-angle of the difference value based on a phase-lock-loop.

Such phase-angle detection can be easily implemented when using a phase-lock-loop.

The phase lock loop (PLL) generates an output signal whose phase is related to the phase of an input signal. The PLL can be advantageously implemented either by electronic circuit of, preferably, as a part of the software controlling the balancer. A PLL can be seen as a controlled oscillator that generates a periodic output signal that matches frequency and phase-angle of its input target frequency component (e.g., the third harmonic oscillation in this case). Amplitude estimation is also available by software PLL implementations.

Keeping the input and output phase in lock step also implies keeping the input and output frequencies the same.

In another exemplary implementation of the controller, the controller is configured to determine the phase-angle and magnitude of the difference value based on a discrete Fourier transform calculation.

For example, a recursive discrete Fourier transform (DFT) identifies phase-angle of a target harmonic component.

The discrete Fourier transform calculation can be a real-time DFT calculation, for example, i.e., a DFT performed in real-time.

In an exemplary implementation of the controller, the controller is configured to determine a sign for the switching based on the phase-angle of the difference value.

This provides the advantage that by determining the sign for the switching, the switching can be adapted in order to reduce the imbalance and thus the voltage oscillations of the power converter.

In an exemplary implementation of the controller, the controller comprises a current control loop for controlling the mid-point current based on the sign and the magnitude of the difference value.

This provides the advantage that the current control loop can regulate the average value of the current processed by the balancer circuit and hence provide a controlled, consistent reduction of the DC link midpoint voltage oscillation across the wide operation range of the power converter.

In an exemplary implementation of the controller, the current control loop is configured to regulate an average value of the mid-point current.

This provides the advantage that the current control loop can provide a controlled, consistent reduction of the DC link midpoint voltage oscillation across the wide operation range of the power converter. For a given power handling capacity, the current control loop can minimize the mid-point voltage oscillations and the associated effects.

In an exemplary implementation of the controller, an output of the current control loop is configured to provide a switching reference value for the switching of the balancer circuit.

This provides the advantage that the current control loop can optimally adjust the switching elements of the balancer circuit based on the switching reference value.

In an exemplary implementation of the controller, the controller is configured to determine a current control reference value for the current control loop based on the magnitude of the difference between dc-link voltage values and a measurement value of a converter current processed by the power converter.

The advantage of the reference calculation is its accuracy and quickness.

In an exemplary implementation of the controller, the controller is configured to determine the current control reference value based on a linear relationship with the measurement value of the converter current within a predetermined range of the measurement value of the converter current.

This provides the advantage that the current control reference value can be easily determined without involving much computational resources.

In an exemplary implementation of the controller, the controller is configured to set the current control reference value to a predefined value when the measurement value of the converter current is within a range above the predetermined range of the measurement value of the converter current.

This provides the advantage that when the output current of the power converter is at the rated output, the DC-link will experience maximum unbalance and the full capacity of the balancer circuit can be employed without any limitation.

In an exemplary implementation of the controller, the controller is configured to instruct the balancer circuit to stop processing power, when the measurement value of the converter current is within a range below the predetermined range of the measurement value of the converter current.

This provides the advantage that the controller reduces and eventually stops the action by the balancer circuit at low power conversion levels of the power converter in order to minimize the impact on the overall power conversion efficiency.

In an exemplary implementation of the controller, the controller is configured to determine the phase-angle and the magnitude of the difference value with respect to a reference frame origin.

With respect to a reference frame, a distance can be easily defined to the origin, i.e., the origin of the reference frame. For example, a magnitude of zero and a phase-angle of zero can be the origin.

This provides the advantage that the reference frame can be a predetermined waveform rotating at three times the grid frequency, since it was observed that the DC voltage oscillation corresponds to a frequency at three times the grid frequency, which is known.

The reference frame can represent a wave at the integer harmonic of the predetermined grid frequency. The predetermined grid frequency can be for example 50 Hz or 60 Hz. For a three-phase system, the integer harmonic of the predetermined grid frequency can be three times the grid frequency, i.e., 150 Hz or 180 Hz, for example.

The samples of the reference frame can be stored in a memory section, e.g., a lookup table. In this memory section or lookup table, phase-angle and magnitude values corresponding to the respective samples can be stored and accessed, i.e., looked-up, by the controller.

In an exemplary implementation of the controller, the reference frame is stored in a memory section comprising samples of a wave at the integer harmonic of the grid frequency.

This provides the advantage that the controller can easily access the reference frame and hence quickly determine the phase-angle and the magnitude of the difference value.

In an exemplary implementation of the controller, the grid frequency corresponds to a frequency of 50 Hz or 60 Hz.

This provides the advantage that a known grid frequency of 50 Hz or 60 Hz can be used to improve the processing of the phase-angle and the magnitude of the difference value.

In an exemplary implementation of the controller, the integer harmonic of the grid frequency corresponds to a third harmonic of the grid frequency.

The reason to use the third harmonic is because it is the one of high magnitude and then the phase-angle calculations are more accurate.

In an exemplary implementation of the controller, the reference frame is a predefined frame at three times a line frequency of the power converter.

This provides the advantage that the line frequency of the power converter is known and hence the reference frame can be stored in memory during an initialization phase.

The line frequency of the power converter may correspond to the predetermined grid frequency. It may be 50 Hz or 60 Hz, for example.

In an exemplary implementation of the controller, the power converter comprises a three-phase DC-AC converter for converting between DC power and three-phase alternating current, AC, power, based on a multilevel circuit topology.

This provides the advantage that an efficient conversion between DC power and AC power can be achieved.

In an exemplary implementation of the controller, the power converter comprises a three-phase AC-DC converter for converting between three-phase AC power and DC power, based on a multilevel circuit topology.

This provides the advantage that an efficient conversion between AC power and DC power can be achieved.

In an exemplary implementation of the controller, the controller is configured to receive a first DC link voltage value across the first DC link and receive a second DC link voltage value across the second DC link.

This provides the advantage that the controller obtains the DC link voltage values in order to control them.

In an exemplary implementation of the controller, the controller is configured to determine the phase-angle of the difference between dc-link voltage values based on a real-time Discrete Fourier Transform calculation.

This provides the advantage that the real-time DFT can perform in real-time and can be directly implemented in the controller.

According to a second aspect, the disclosure relates to a balancer circuit for controlling a mid-point current at a mid-point terminal of a power converter, the balancer circuit comprising: a control terminal configured to set the switching signals provided by the controller according to the first aspect described above; a first switch configured to switch the first DC link of the power converter based on the switching signal; and a second switch configured to switch the second DC link of the power converter based on the switching signal.

Such a balancer circuit controlled by the controller as described above provides the following advantages: The balancer circuit controlled by the controller as described above provides a controlled, consistent reduction of the DC-link midpoint voltage oscillation across the wide operation range of the power converter. The balancer circuit can be controlled in such way that for a given power handling capacity it minimizes the mid-point voltage oscillations and the associated effects, e.g., the RMS current value on the DC-link capacitors. The action by the balancer circuit can be reduced or eventually stopped at low power conversion levels of the power converter, in order to minimize the impact on the overall power conversion efficiency. The balancer circuit is not limited to a specific circuit topology, buck-boost is used here just as an example. The balancer circuit can be implemented based on various types of circuit topology.

According to a third aspect, the disclosure relates to a method for controlling a balancer circuit, wherein the method comprises: determining a difference value between a first DC link voltage value across a first DC link of a power converter and a second DC link voltage value across a second DC link of the power converter; determining a phase-angle and a magnitude of the difference value for an integer harmonic of a predetermined grid frequency; and providing a switching signal for switching between the first DC link and the second DC link based on the phase-angle and the magnitude in order to control a mid-point current at a mid-point terminal of the power converter in terms of magnitude and direction based on the switching signal.

Such a method provides the advantage of an efficient control scheme for efficiently controlling the balancer circuit, in particular a control scheme that enables regulating the degree of unbalance according to the specific needs.

According to a fourth aspect, the disclosure relates to a computer program product including computer executable code or computer executable instructions that, when executed, causes at least one computer to execute the method according to the third aspect described above.

The computer program product may run on a controller or a processor for controlling the above-described balancer circuit, e.g., a controller according to the first aspect as described above.

According to a fifth aspect, the disclosure relates to a computer-readable medium, storing instructions that, when executed by a computer, cause the computer to execute the method according to the third aspect described above. Such a computer readable medium may be a non-transient readable storage medium. The instructions stored on the computer-readable medium may be executed by a controller or a processor for controlling the above-described balancer circuit.

The solution according to the disclosure provides the following advantages:

The disclosed controller and control method enable control of the degree of voltage balancing control, in that way the amount of power processed by the circuit balancer is also controlled. In this way, the control action can be adjusted according to system operation conditions, avoiding negatively impacting the overall system efficiency.

The disclosed controller and control method are simple and robust, i.e., not linked to system parameters that can experience change or drift, and they provide a good and consistent performance across the system operation envelope.

The required hardware for implementing the disclosed controller and control method is compact and light.

The disclosed controller and control method ensure that the hardware of the circuit balancer, i.e., the auxiliary power converter, is optimally used. This means that the processed power can be fully utilized to balance the voltage.

The disclosed controller and control method can keep the voltage balancing at the desired level across all operating conditions while requiring minimum effort from the circuit balancer. This means that there is no unnecessary power re-circulating among the DC-links. The disclosed controller and control method is not negatively impacting the system performance, or efficiency.

BRIEF DESCRIPTION OF THE DRAWINGS

Exemplary embodiments of the disclosure will be described with respect to the following figures, in which:

FIG. 6 shows exemplary characteristics 600a, 600b, 600c for the DC capacitor currents of a power converter 110 as shown in FIG. 3a; and FIG. 7 shows a schematic diagram of a method 700 for controlling a balancer circuit according to the disclosure.

DETAILED DESCRIPTION

In the following detailed description, reference is made to the accompanying drawings, which form a part thereof, and in which is shown by way of illustration specific aspects in which the disclosure may be practiced. It is understood that other aspects may be utilized and structural or logical changes may be made without departing from the scope of the disclosure. The following detailed description, therefore, is not to be taken in a limiting sense, and the scope of the disclosure is defined by the appended claims.

It is understood that comments made in connection with a described method may also hold true for a corresponding device or system configured to perform the method and vice versa. For example, if a specific method step is described, a corresponding device may include a unit to perform the described method step, even if such unit is not explicitly described or illustrated in the figures. Further, it is understood that the features of the various exemplary aspects described herein may be combined with each other, unless specifically noted otherwise.

This disclosure introduces a new controller and control method to balance the mid-point in a multilevel converter in order to reduce the voltage oscillations while at the same time introducing minimum impact in term of circulating currents or additional power losses. In this way the balancer circuit hardware is fully utilized. The hardware blocks are shown in FIG. 1 and the novel control scheme is shown in FIG. 2.

Figure 1:
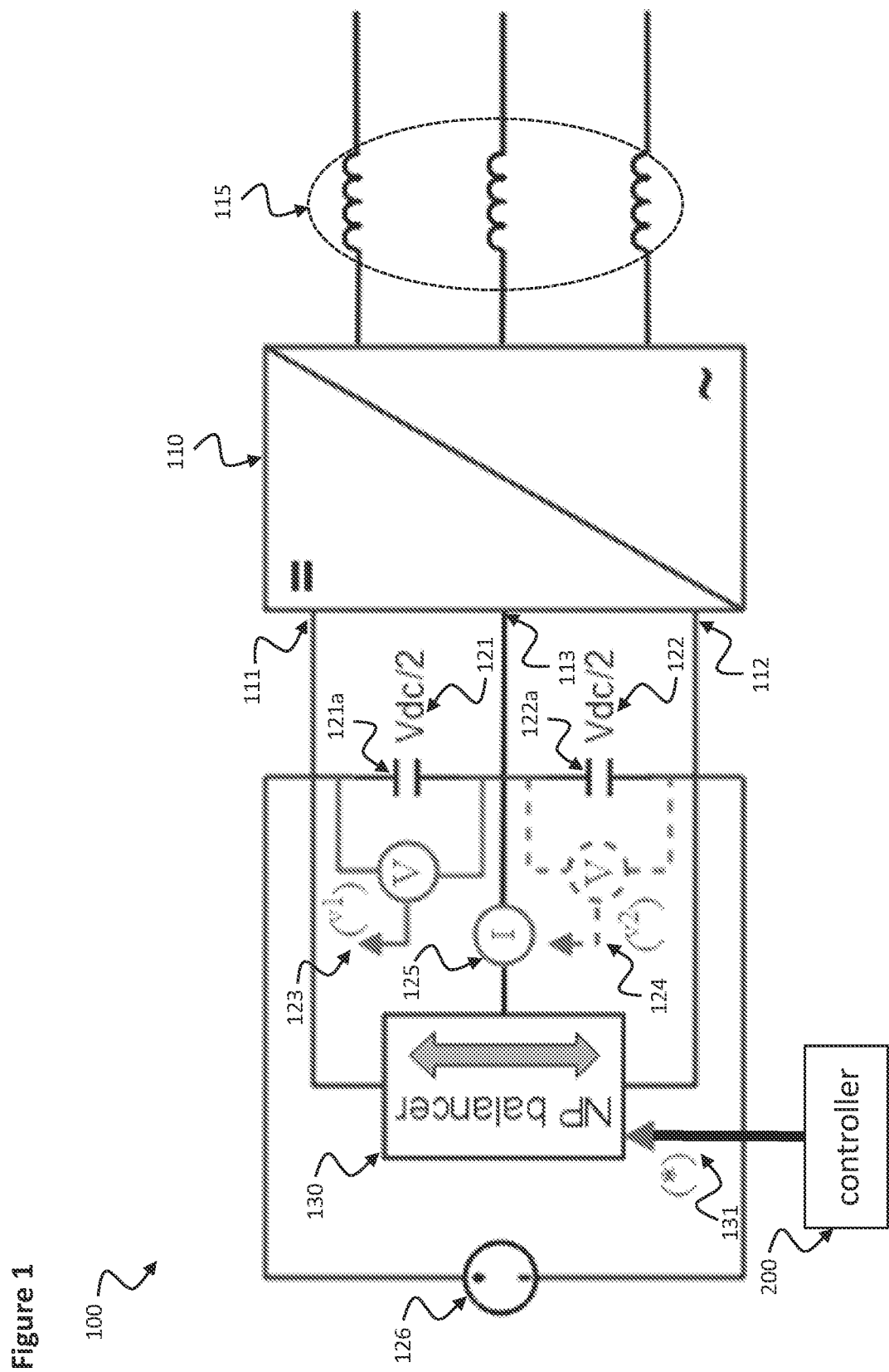
FIG. 1 shows a block diagram 100 of a balancer circuit 130 connected to a power converter 110 and controlled by a controller 200 according to the disclosure.
Figure 2:
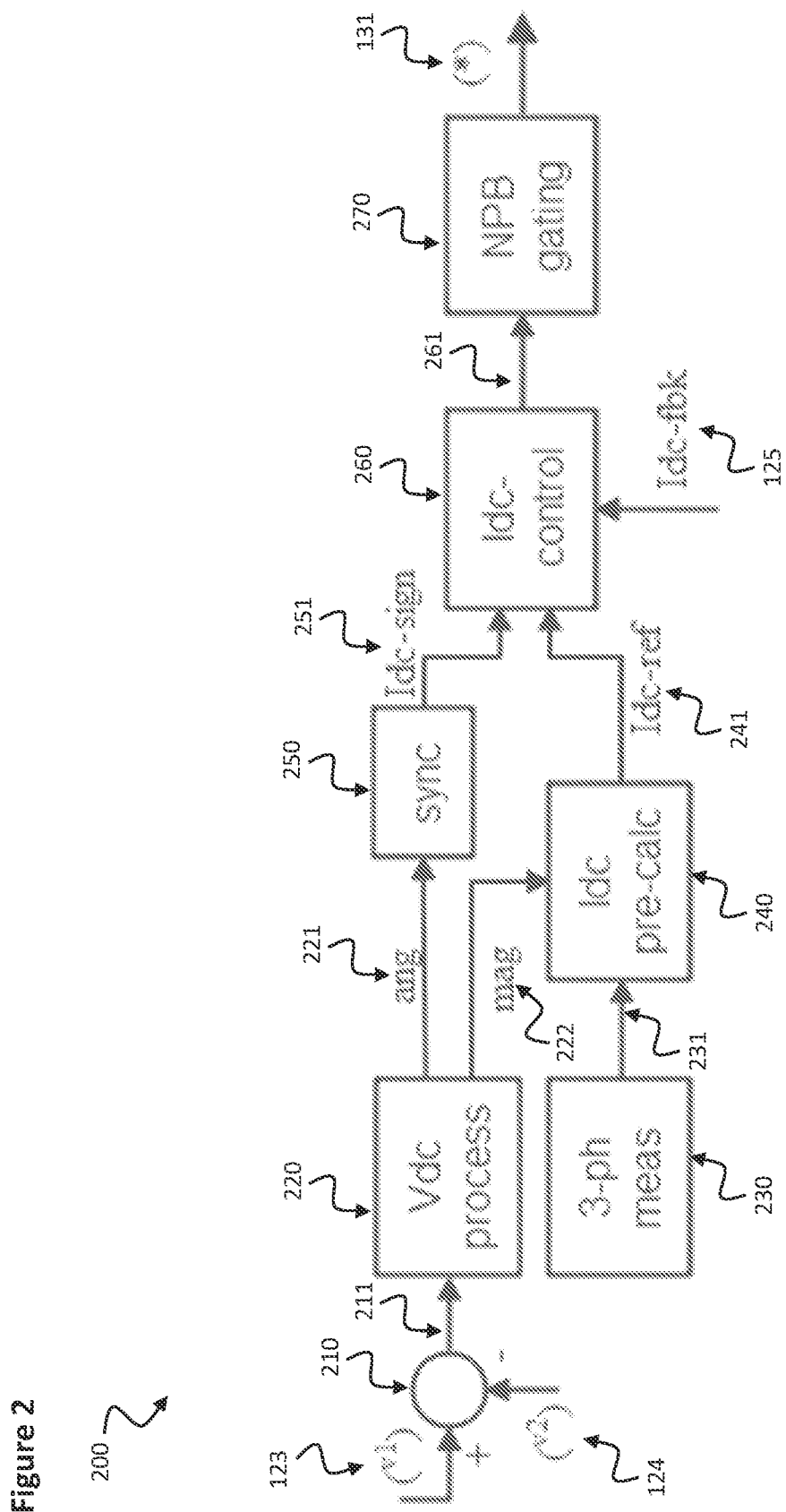
FIG. 2 shows a block diagram of the controller 200 shown in FIG. 1 according to the disclosure.

FIG. 1 shows a block diagram 100 of a balancer circuit 130 connected to a power converter 110 and controlled by a controller 200 according to the disclosure.

The power converter 110 comprises a three-phase DC-AC converter for converting between DC power and three-phase AC power based on a multilevel circuit topology of the power converter 110. In reverse direction, the power converter 110 comprises a three-phase AC-DC converter for converting between three-phase AC power and DC power based on a multilevel circuit topology of the power converter 110.

The power converter 110 comprises a first DC terminal 111, a second DC terminal 112 and a mid-point DC terminal 113 for transporting DC power. The power converter 110 comprises a three-phase AC terminal 115 for transporting AC power.

A first DC link 121 is formed across the first DC terminal 111 and the mid-point DC terminal 113 of the power converter 110. A second DC link 122 is formed across the second DC terminal 112 and the mid-point DC terminal 113 of the power converter 110.

A DC voltage source 126 may be connected between the first DC terminal 111 and the second DC terminal 112 of the power converter 110.

The first DC link 121 comprises a first DC link capacitor 121a. A measurement value of a voltage across the first DC link capacitor 121a may be provided by a voltage sensor as a first DC link voltage value 123 to the controller 200.

The second DC link 122 comprises a second DC link capacitor 122a. A measurement value of a voltage across the second DC link capacitor 122a may be provided by a voltage sensor as a second DC link voltage value 124 to the controller 200.

The controller 200 may be configured to receive the first DC link voltage value 123 across the first DC link 121 and to receive the second DC link voltage value 124 across the second DC link 122.

The balancer circuit 130 can be used for controlling a mid-point current 125 at a mid-point terminal 113 of a power converter 110. The mid-point current 125 may be sensed by a current sensor and provided to the controller 200.

The balancer circuit 130 comprises a control terminal configured to set a switching signal 131 provided by the controller 200.

Figure 4A:
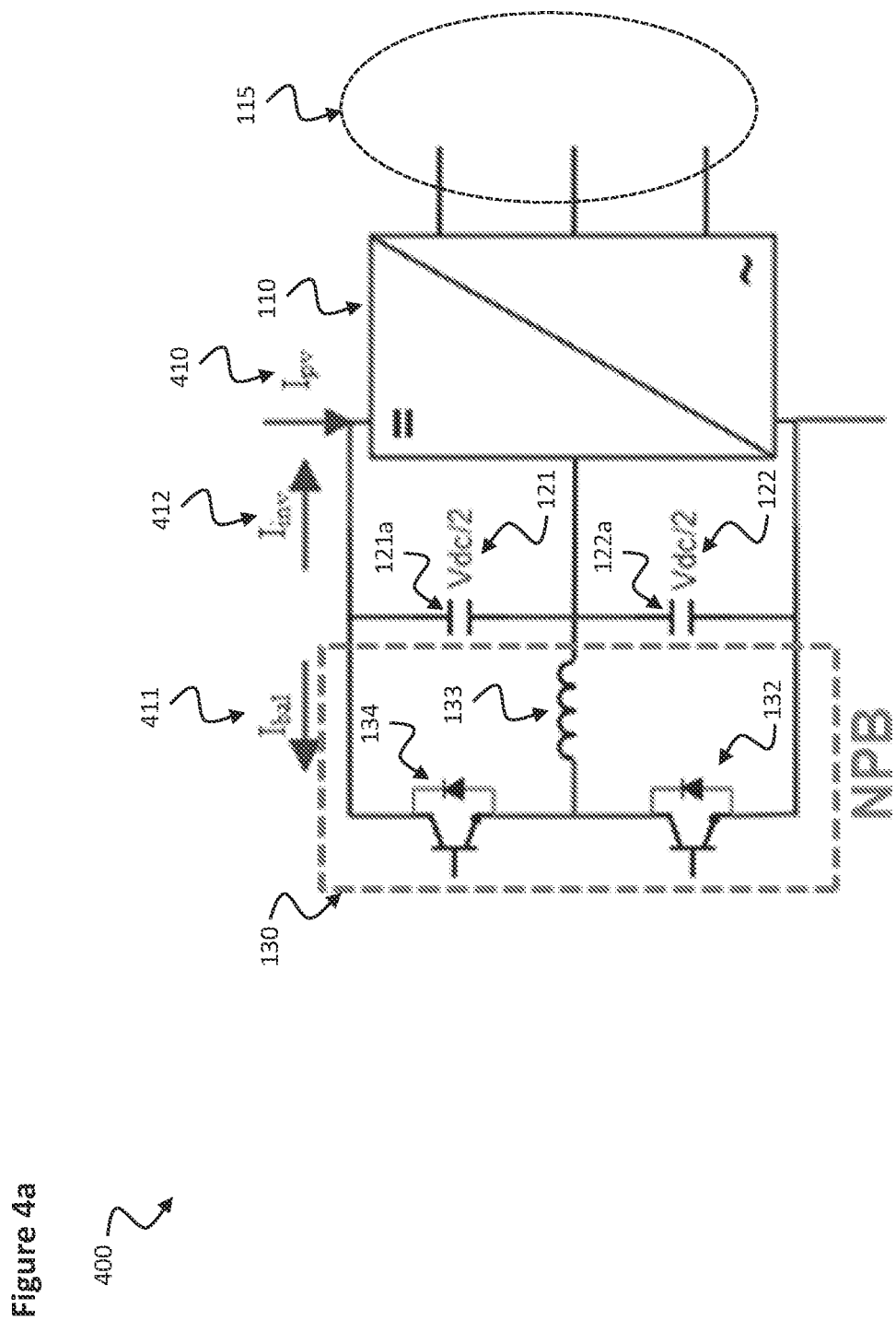
FIG. 4a shows a schematic diagram 400 illustrating a model of a balancer circuit 130 connected to a power converter 110.

The balancer circuit 130 comprises a first switch 134, e.g., as shown in FIG. 4a, configured to switch the first DC link 121 of the power converter 110 based on the switching signal 131.

The balancer circuit 130 comprises a second switch 132, e.g., as shown in FIG. 4a, configured to switch the second DC link 122 of the power converter 110 based on the switching signal 131.

The controller 200 is configured to control the balancer circuit 130. The controller 200 is configured to determine a difference value 211, e.g., as shown in FIG. 2, between the first DC link voltage value 123 across the first DC link 121 of the power converter 110 and the second DC link voltage value 124 across the second DC link 122 of the power converter 110.

The controller 200 is configured to determine a phase-angle 221 and a magnitude 222, e.g., as shown in FIG. 2, of the difference value 211 for an integer harmonic of a predetermined grid frequency.

The controller 200 is configured to provide the switching signal 131 for switching between the first DC link 121 and the second DC link 122 based on the phase-angle 221 and the magnitude 222. The controller 200 is configured to control the mid-point current 125 at the mid-point terminal 113 of the power converter 110 in terms of magnitude and direction based on the switching signal 131.

The difference value 211 can be a sample value sampled by an A/D converter, e.g., after the voltage measurements shown in FIG. 1. This sample value can be in units of volt, for example. However, the difference value can also be a per unit value.

Figure 4B:
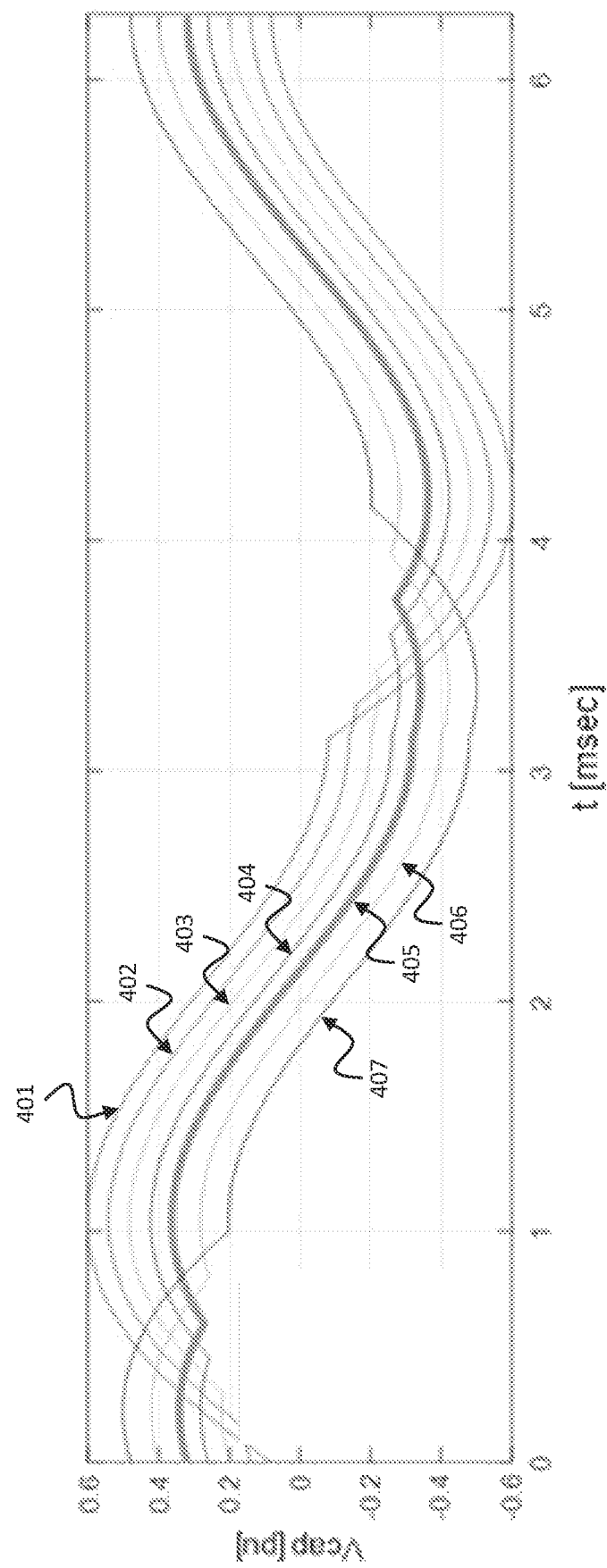
FIG. 4b shows an exemplary characteristic 400b for the DC voltage oscillation for various values of the injection angle.

The magnitude and phase-angle correspond to some particular frequency, that is, an integer harmonic of the grid frequency, e.g., 50 or 60 Hz. More specifically, the third one is the most likely to be used, i.e., 150 Hz. That is, the phase-angle and magnitude correspond to a main harmonic component of the ripple as can be seen in FIG. 4b. In practice this will be the third harmonic, i.e., 150 Hz.

The integer harmonic of a predetermined grid frequency can be samples of a reference frame representing a wave at the predetermined grid frequency. The samples can be stored in a memory section, e.g., a lookup table. In this memory section or lookup table, phase-angle and magnitude values corresponding to the respective samples can be stored and accessed by the controller 200.

The predetermined grid frequency can be for example 50 Hz or 60 Hz. For a three-phase system, the integer harmonic of the predetermined grid frequency can be three times the grid frequency, i.e., 150 Hz or 180 Hz, for example.

The first DC link voltage value 123 can be obtained by sensing or measuring the DC bus voltage of the first DC link 121 and transmitting the sensed voltage, after sampling by an ADC, to the controller 200.

The second DC link voltage value 124 can be obtained by sensing or measuring the DC bus voltage of the second DC link 122 and transmitting the sensed voltage, after sampling by an ADC, to the controller 200.

FIG. 2 shows a block diagram of the controller 200 shown in FIG. 1 according to the disclosure.

The block diagram in FIG. 2 shows schematically the control method presented in this disclosure. This control method or control scheme may be performed by the controller 200 shown in FIG. 1. The two voltages 123, 124 from the DC-link capacitors 121a, 122a that are balanced are measured and the difference 211, which represents the oscillation of the DC-links 121, 122, is used for the control. Such measurement may be processed in order to detect the magnitude 222 and phase-angle 221.

The phase-angle 221 can be used to provide the sign 251 for the power transfer direction from the balancer circuit 130, e.g., NPB. I.e., if energy is transferred from top to bottom, or bottom to top. The magnitude 222 of the oscillation, together with the current 231 in the converter 110 can be used to set the reference value 241 for the current control 260.

The magnitude 222 and the sign 251 define the reference value for the current control (Idc-control) 260. This controller 260 regulates the average value of the current processed by the balancer circuit 130, e.g., NPB. This controller 260 can be of a linear type such as a PI (proportional-integral). The output of the current controller 260 provides the reference value 261 for the gating of the power semiconductors in the balancer circuit 130, e.g., NPB.

In the following, the functionality of the controller 200 as shown in FIG. 2 is described.

As described above with respect to FIG. 1, the controller 200 is configured to control the balancer circuit 130. The controller 200 is configured to determine a difference value 211 between the first DC link voltage value 123 across the first DC link 121 of the power converter 110 and the second DC link voltage value 124 across the second DC link 122 of the power converter 110. The controller 200 is configured to determine a phase-angle 221 and a magnitude 222 of the difference value 211 for an integer harmonic of a predetermined grid frequency.

The controller 200 is configured to provide the switching signal 131 for switching between the first DC link 121 and the second DC link 122 based on the phase-angle 221 and the magnitude 222. The controller 200 is configured to control the mid-point current 125 at the mid-point terminal 113 of the power converter 110 in terms of magnitude and direction based on the switching signal 131.

The controller 200 may be configured to determine the phase-angle 221 of the difference value 211 based on a phase-lock-loop, for example.

The controller 200 may be configured to determine the phase-angle 221 of the difference value based on a Discrete Fourier Transform calculation, for example. The Discrete Fourier Transform calculation can be a real-time DFT calculation, i.e., performed in real-time.

The controller 200 may be configured to determine the sign 251 for the switching based on the phase-angle 221 of the difference value 211.

The controller 200 may comprise a current control loop 260 for controlling the mid-point current 125 based on the sign 251 and the magnitude 222 of the difference value 211.

The current control loop 260 may be configured to regulate an average value of the mid-point current 125.

An output of the current control loop 260 may be configured to provide a switching reference value 261 for the switching of the balancer circuit 130.

The controller 200 may be configured to determine a current control reference value 241 for the current control loop 260 based on the magnitude 222 of the difference value 211 and a measurement value 231 of a converter current processed by the power converter 110.

Figure 5A:
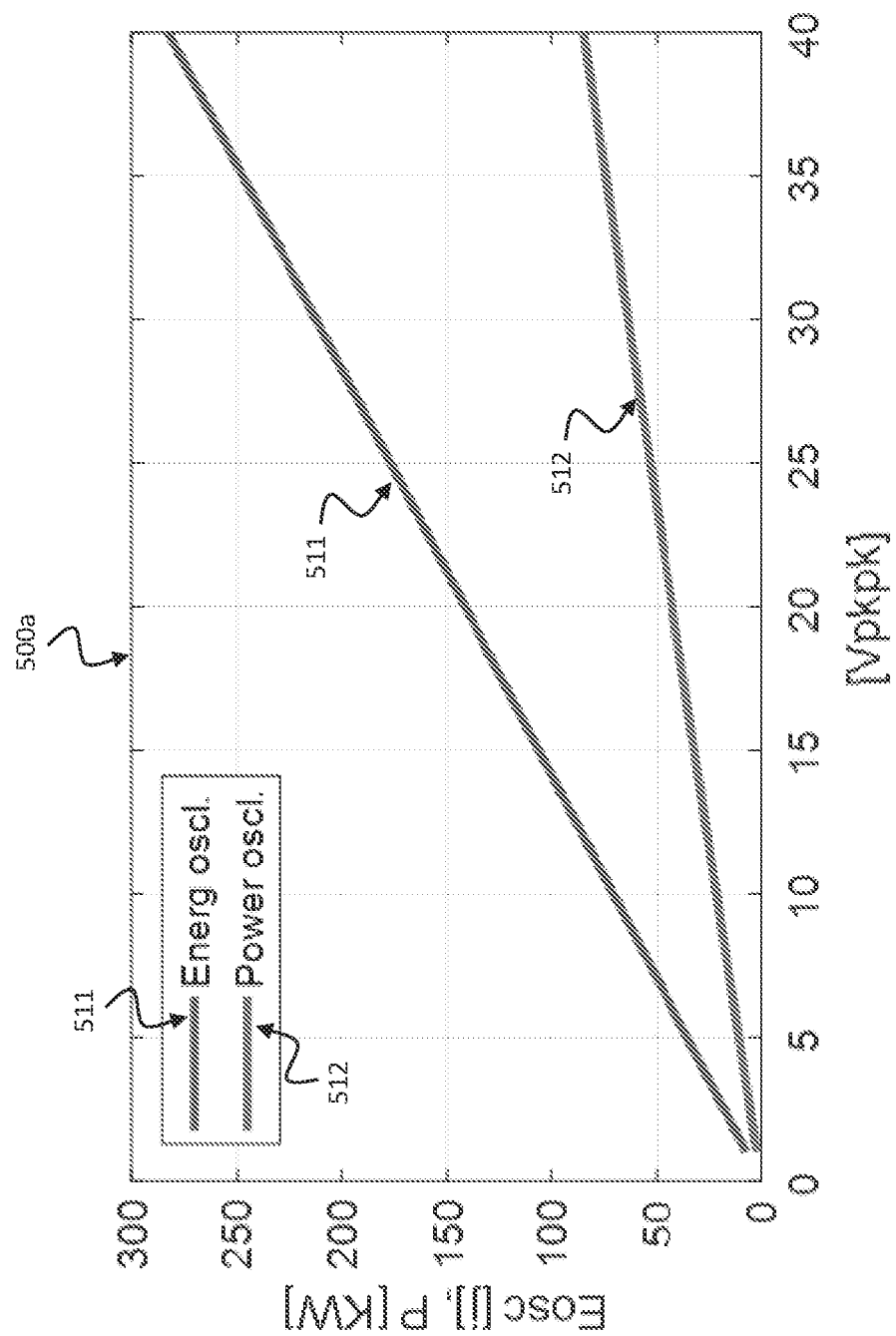
FIG. 5a shows an exemplary characteristic 500a for the energy and power oscillation as a function of the DC voltage oscillation.

The controller 200 may be configured to determine the current control reference value 241 based on a linear relationship with the measurement value 231 of the converter current within a predetermined range 502 of the measurement value 231 of the converter current. Such linear relationship is shown in FIGS. 5a and 5b as an example.

Figure 5B:
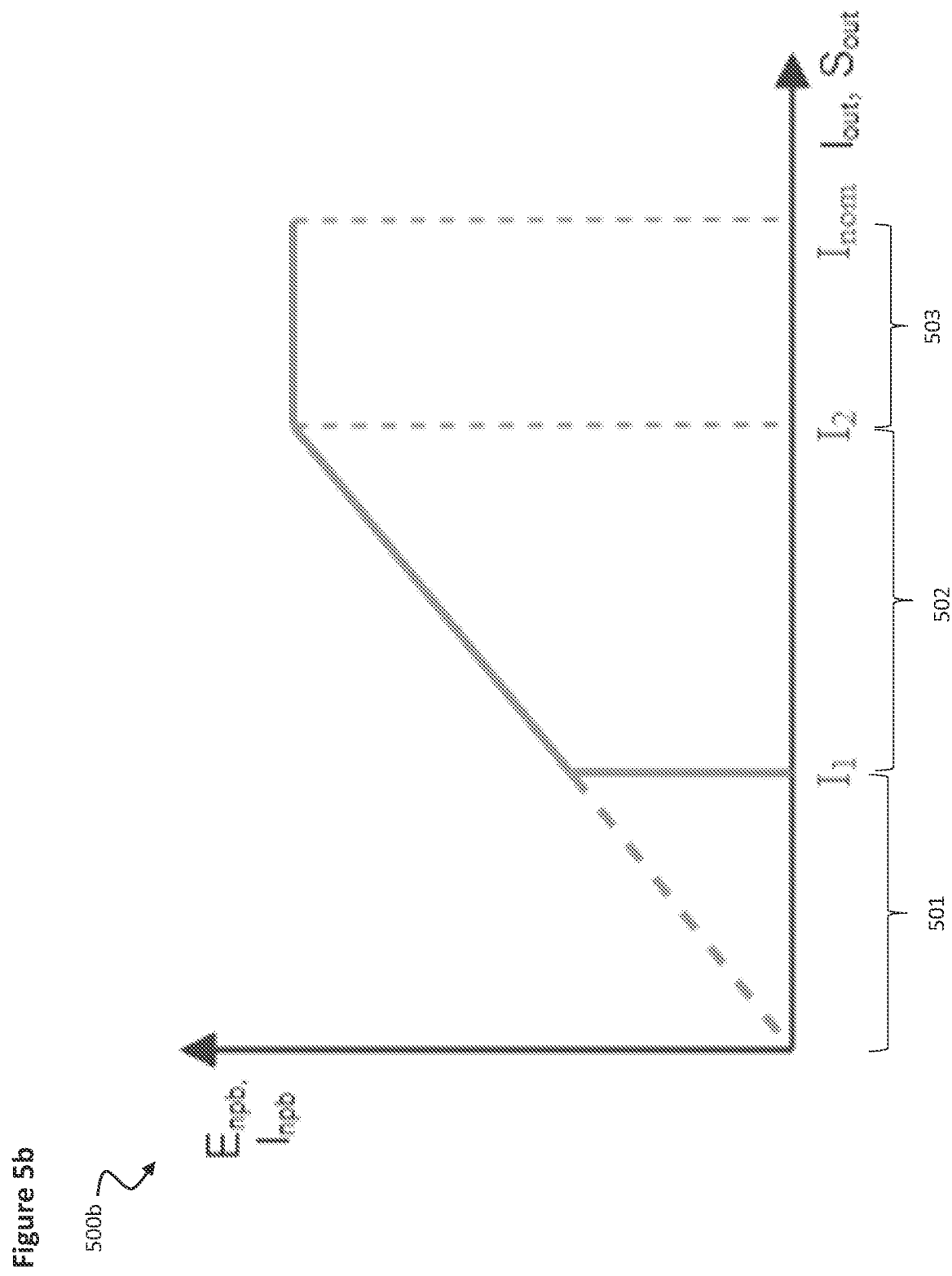
FIG. 5b shows an exemplary characteristic 500b for a current reference magnitude according to the disclosure.

The controller 200 may be configured to set the current control reference value 241 to a predefined value when the measurement value 231 of the converter current is within a range 503 above the predetermined range 502 of the measurement value 231 of the converter current, e.g., as shown in FIG. 5b.

The controller 200 may be configured to instruct the balancer circuit 130 to stop processing power, when the measurement value 231 of the converter current is within a range 501 below the predetermined range 502 of the measurement value 231 of the converter current, e.g., as shown in FIG. 5b.

The controller 200 may be configured to determine the phase-angle 221 and the magnitude 222 of the difference value 211 with respect to a reference frame.

The reference frame can represent a wave at the integer harmonic of the predetermined grid frequency. The predetermined grid frequency can be for example 50 Hz or 60 Hz. For a three-phase system, the integer harmonic of the predetermined grid frequency can be three times the grid frequency, i.e., 150 Hz or 180 Hz, for example.

The samples of the reference frame can be stored in a memory section, e.g., a lookup table. In this memory section or lookup table, phase-angle and magnitude values corresponding to the respective samples can be stored and accessed, i.e., looked-up, by the controller.

The reference frame may be stored in a memory section comprising samples of a wave at the integer harmonic of the grid frequency.

In one example, the grid frequency may correspond to a frequency of 50 Hz or 60 Hz. In one example, the integer harmonic of the grid frequency may correspond to a third harmonic of the grid frequency, e.g., as described below with respect to FIG. 4b.

The reference frame can be a predefined frame at three times a line frequency of the power converter 110.

The line frequency of the power converter may correspond to the predetermined grid frequency. It may be 50 Hz or 60 Hz, for example.

Figure 3A:
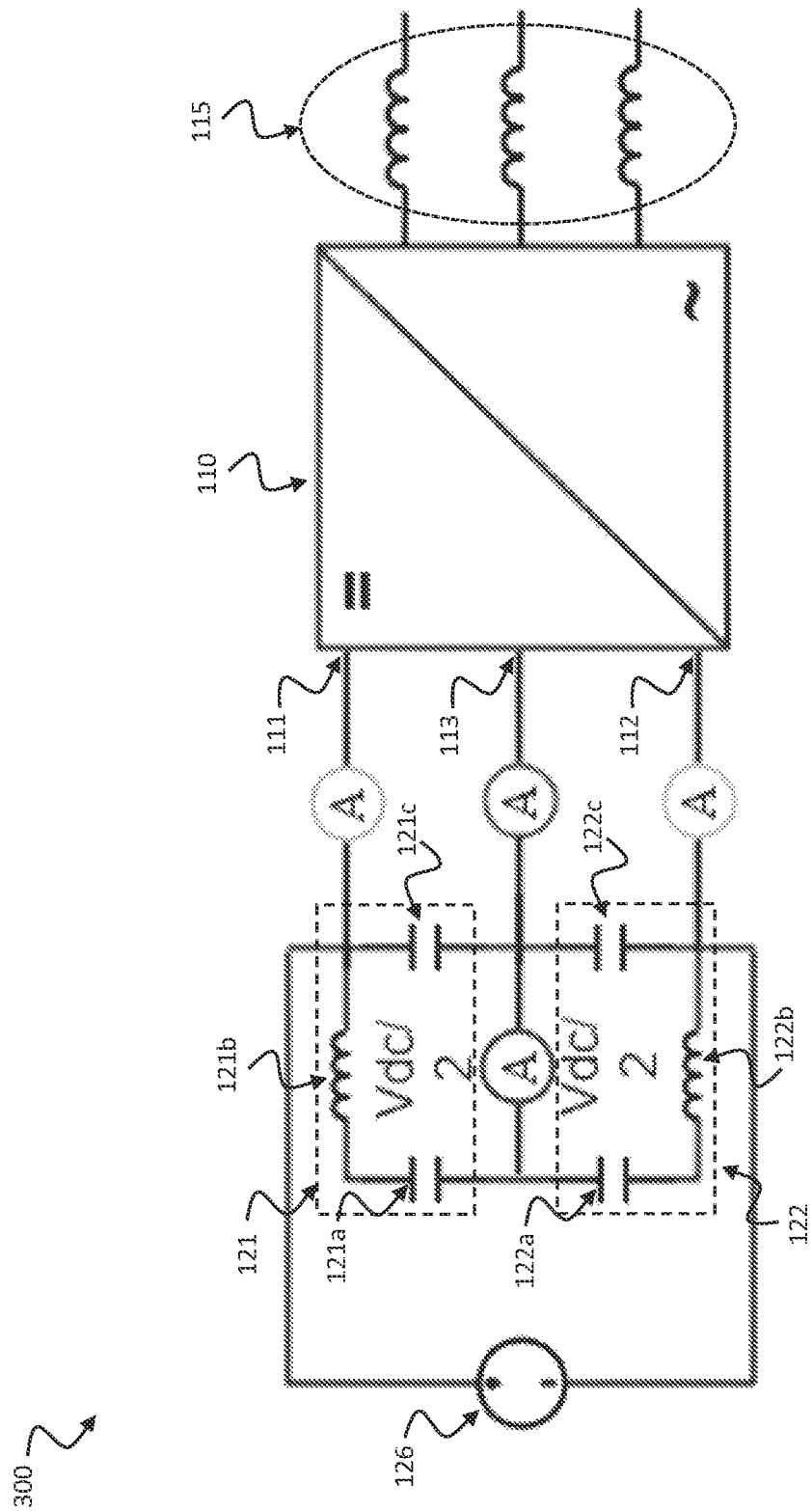
FIG. 3a shows a circuit diagram 300 of an exemplary power converter 110 with DC link configured in a split mode with different capacitor types.

FIG. 3a shows a circuit diagram 300 of an exemplary power converter 110 with DC link configured in a split mode with different capacitor types.

In the example of FIG. 3a, the first DC link 121 is connected between the first DC terminal 111 and the mid-point terminal 113 of the power converter 110. The first DC link 121 comprises a parallel connection of a first type capacitor 121a in series with an inductor 121b and a second type capacitor 121c. The first type capacitor 121a can be an electrolytic capacitor, for example, and the second type capacitor 121c can be a film capacitor, for example.

The first DC link 121, the second DC link 122 is connected between the second DC terminal 112 and the mid-point terminal 113 of the power converter 110. Similar to the first DC link 121, the second DC link 122 comprises a parallel connection of a first type capacitor 122a in series with an inductor 122b and a second type capacitor 122c. The first type capacitor 122a can be an electrolytic capacitor, for example, and the second type capacitor 122c can be a film capacitor, for example.

In the following, the optimal phase-angle for the balance circuit 130, e.g., NPB, is examined with respect to the circuit 300 shown in FIG. 3a.

In the following analysis it is shown how to select the optimal phase-angle for the NPB operation. The analysis is made through simulations at various operation conditions searching for that optimal phase-angle. The circuit 300 used for the runs is schematically represented in FIG. 3a. It is observed in FIG. 3a that the DC-link is configured in a split mode with capacitors 121c, 122c absorbing high-frequency current components and capacitors 121a, 122a being circulated by low frequency current components. This last being connected through a small inductance 121b, 122b.

Figure 3B:
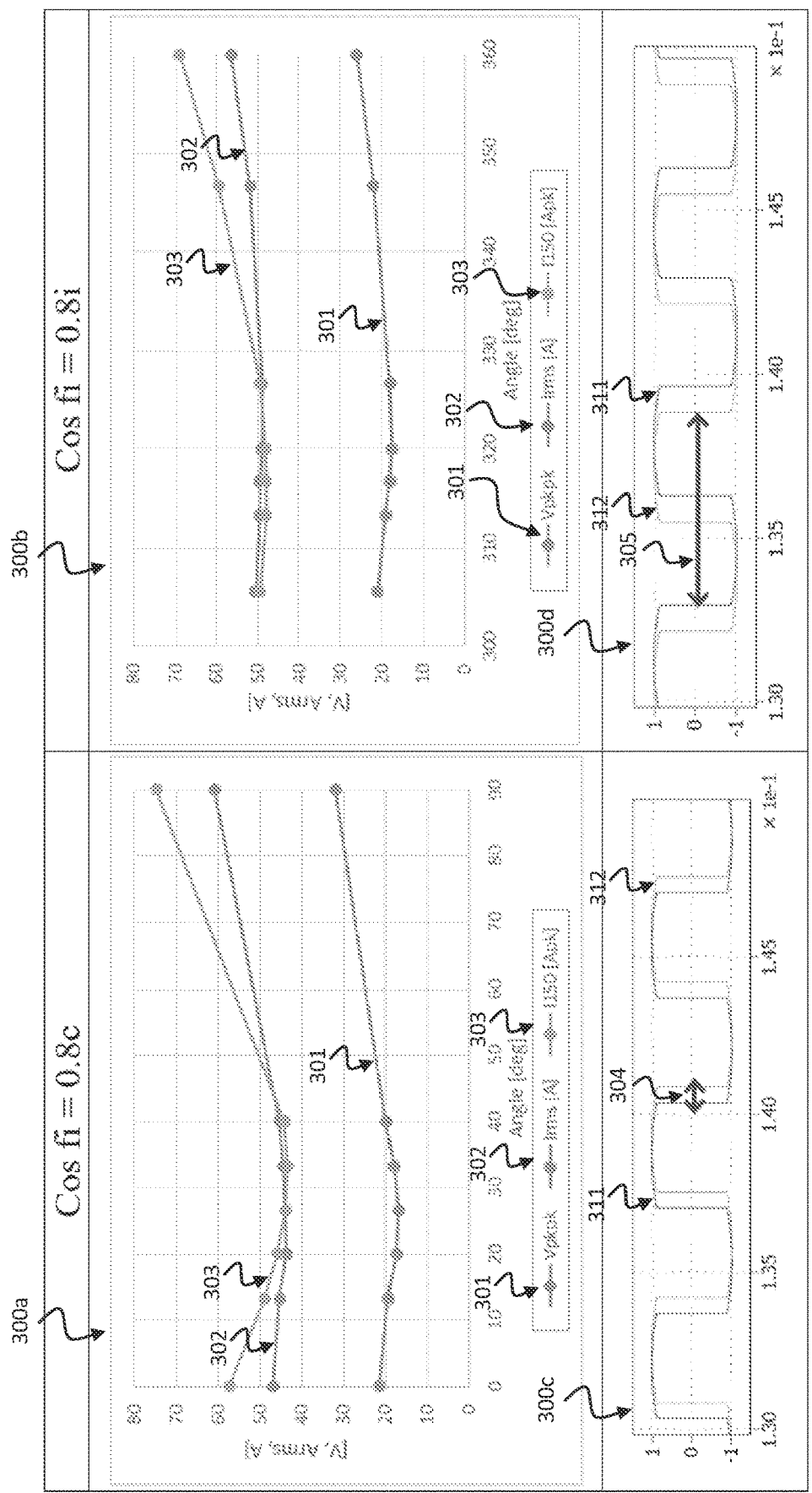
FIG. 3b shows exemplary characteristics for a magnitude 300a, 300b of the DC link oscillation and exemplary waveforms 300c, 300d of a switching signal according to the disclosure.

The results of the simulations are presented in FIG. 3b where different magnitudes affecting the DC-link capacitors, like the $V_{pkpk}$ 301 of the DC-link oscillation, and the current on the low-frequency capacitors are plot as function of the phase-angle between the voltage modulated by the inverter and the NPB injection. This phase-angle represents the relative timing of the inverter modulation and the direction of the power converted by the NPB circuit in a scale three times the grid frequency, e.g., for a 50 Hz system it would be 150 Hz. In other words, a phase-angle equal to zero means that the NPB starts sending power to the upper DC-link when one of the phase voltages is at its most positive value, i.e., between 60 and 120 degrees, which in the case of DPWM coincides with the clamping of that phase to the DC positive bus.

The multi-case simulation shown in FIG. 3b can be used for search of optimum injection angle. The top charts 300a, 300b show the magnitude of the $V_{pkpk}$ DC-link oscillation 301, $I_{rms}$ 302 on the electrolytic capacitors 121a, 122a, and fundamental frequency component 303 (3×fac=150 Hz). The bottom charts 300c, 300d show waveforms 311, 312 representing the DPWM clamping 304, 305 at DC+/DC− and sign of the NPB conversion direction.

The simulation in FIG. 3b provides the results for two different power factors (0.8c and 0.8i) and clearly shows that there is an optimal phase-angle where the voltage oscillation and the currents on the low-frequency capacitors reach a minimum. It also shows that the optimal phase-angle is dependent on the power factor condition. The disclosed control method is designed to be able to detect such optimal phase-angle automatically.

FIG. 4a shows a schematic diagram 400 illustrating a model of a balancer circuit 130 connected to a power converter 110.

The model shows a circuit for mid-point balance being connected to the DC-link of a three-level converter 110. The principle of operation for this DC-DC converter, i.e., balancer circuit 130, is by transferring instantaneous power between the different sections of the DC-link. This power transfer reflects in the energy stored at the DC-link capacitors 121a, 122a, i.e. the capacitor charge, which reflects on the capacitor voltage. By properly transferring charge among the DC-link sections 121, 122 the balancer circuit 130 can reduce the oscillation of the intermediate points and achieve a good mid-point balance. In this disclosure, a new control method to control the balancer circuit 130 is presented in order to take full advantage of the power processing capacity of the mid-point balancer 130 and obtain a consistent voltage balance across the wide operation condition range of the multilevel converter 110.

In the following, automatic detection of the optimal phase-angle is described by using the model of the balancer circuit 130 shown in FIG. 4a.

The oscillations created by the action of both the multi-level converter DC/AC 110 and the NPB circuit 130 are analysed with the schematic depicted in FIG. 4a where it is possible to see that the voltage in the DC-link capacitors 121a, 122a are the resultant of the current circulating through them. Those currents 411, 412 are being produced by the DC/AC multilevel converter 110 and the NPB circuit 130.

The voltage in the DC-link capacitors 121a, 122a is given by the following expression:

$$v_c(t) = -\frac{1}{C} \cdot \int_{\theta_1}^{\theta_2} \{i_{inv}(t) + i_{bal}(t)\} \cdot dt$$

The low-frequency components, i.e., fundamental harmonic with amplitude $I_m$ and DC components $I_{ci}$, of the current 412 introduced by the inverter 110 can be described by the following expression:

$$i_{inv}(t) = I_m \cdot \sin(\omega t) + I_{ci}$$

where $\omega$ is the angular speed of the DC-link oscillation whose frequency corresponds to three times the line frequency. It is also desired to use the NPB circuit 130 at constant current during a certain period of time; where this constant current can be equal to the rated current of the NPB 130. In this way, such capacity is used at the maximum level:

$$i_{bal}(t) \cong I_{bal}$$

The previous two currents can now be replaced in the capacitor voltage to obtain:

$$v_c(t) = \frac{1}{C} \cdot \left\{ I_m \cdot \cos(\omega t) - \frac{I_{bal}}{\omega} \cdot \omega t \right\} \quad \theta_1 < \omega t < \theta_2$$

where the phase-angle between $\theta_1$ and $\theta_2$ is set by the time where the injection by the balancer 130 has the value, i.e. magnitude and sign, defined by $I_{bal}$. The last expression shows the two terms contributing to the capacitor voltage. The second terms correspond to the NPB contribution. If this one changes sign during the time between $\theta_1$ and $\theta_2$ its expression would be:

$$v_{c2}(t) = \begin{cases} -\dfrac{I_{bal}}{\omega} \cdot \omega t, & \theta_1 < \omega t < \theta_m \\ \dfrac{I_{bal}}{\omega} \cdot \omega t, & \theta_m < \omega t < \theta_2 \end{cases}$$

where $\theta_m$ is the phase-angle where the balancing current changes sign, hereafter also called injection phase-angle.

FIG. 4b shows the waveform of the DC-link voltage oscillation for various values of the injection phase-angle $\theta_m$. Waveform 401 corresponds to injection phase-angle of 0; Waveform 402 corresponds to injection phase-angle of 0.15; Waveform 403 corresponds to injection phase-angle of 0.3; Waveform 404 corresponds to injection phase-angle of 0.45; Waveform 405 corresponds to injection phase-angle of 0.6; Waveform 406 corresponds to injection phase-angle of 0.8; Waveform 407 corresponds to injection phase-angle of 1.

It can be seen that the minimum fundamental component and minimum amplitude of the VDC oscillation, are both achieved when the phase-angle of injection coincides with the maximum of the fundamental frequency component of the VDC oscillation.

Therefore, this disclosure is based on the finding to detect the fundamental component of the VDC oscillation and use it as reference for the injection phase-angle, $\theta_m$. For that, previously the VDC oscillation was calculated as the difference between the partial DC-links that are being balanced. Once the phase-angle is detected the magnitude of the current processed by the NPB can be kept constant for half the period of the VDC oscillation fundamental component. This current level can be the rated current of the NPB, in this way the maximum possible amount of energy is transferred in each half period.

The detection of the fundamental component can be done in various possible ways. Algorithms can be used which are able to detect the magnitude and phase-angle with respect to a synchronous reference frame, e.g., at three times the line frequency. Some implementations to detect this magnitude and phase-angle are a single-phase phase-lock-loop (1-ph PLL) or a recursive discrete Fourier Transform (R-DFT). However, other algorithms can be used as well.

FIG. 5a shows an exemplary characteristic 500a for the energy and power oscillation as a function of the DC voltage oscillation. The characteristic 500a is used to illustrate determining the magnitude of the NPB current control.

In case the power being processed by the DC/AC multilevel converter is the rated current/power, the NPB can also work processing its rated current, i.e., utilizing its full capacity. However, when the power conversion is at levels lower than the rated power, the VDC oscillation magnitude will be smaller. Therefore, in order to avoid penalizing the efficiency of the overall conversion system, it is convenient to reduce the power processed by the NPB.

The energy associated to the DC-link imbalance can be calculated in terms of the energy stored at the two DC capacitors involved. For a given voltage ripple $V_{pkpk}$, this energy is given by:

$$E_{ub} = 2 \cdot \frac{c}{2} \cdot \left[ (V_{dc} + V_{p2})^2 - (V_{dc} - V_{p2})^2 \right]$$

where:

$$V_{p2} = \frac{V_{pkpk}}{2}$$

Simplifying the energy/power associated to the unbalance can be written as:

$$E_{ub} = 4 \cdot C \cdot V_{dc} \cdot V_{p2} \rightarrow P_{ub} = 6 \cdot E_{ub} \cdot f_{ac}$$

As can be seen in previous expression, if the variation of the DC voltage compared to its average value is small, then the energy is approximately proportional to the value of the ripple voltage. These relationships for energy and power are shown in FIG. 5a showing energy oscillation 511 and power oscillation 512.

On the other side, when an NPB circuit is in operation it will transfer certain amount of energy between the DC capacitors. In case this transfer is done through an inductive type component, as it is the case of the circuit in FIG. 4a, the energy transfer at each switching cycle of the NPB circuit will be:

$$E_{npb} = \frac{L_b}{2} \cdot \left[ (I_{av} + \Delta I)^2 - (I_{av} - \Delta I)^2 \right]$$

where $L_b$ is the value of the inductance in the NPB; $I_{av}$ is the average current processed by the NPB and $\Delta I$ the current change. The previous expression can be simplified to:

$$E_{npb} = 2 \cdot L_b \cdot \Delta I \cdot I_{av}$$

Considering that the change in the current is approximately constant, if the change in the DC voltage is small and the conduction time change is also small, then:

$$E_{nph} \propto I_{av}$$

Therefore, the balancing energy that the NPB process is approximately proportional to the average value of the current, i.e., the controlled current magnitude (average mode control). Because of the linear dependence for both the energy associated to the unbalance $E_{ub}$ and the energy processed by the NPB in terms of the controlled current $E_{npb}$, the characteristic 500b shown in FIG. 5b can be used for the current reference magnitude.

In the characteristic 500b of FIG. 5b the values for $I_1$ and $I_2$ are parameters that can be selected by the user. When the output current is at the rated output, the DC-link will experience maximum unbalance and the full capacity of the balancer can be employed, according to range 503. When the inverter current drops, below some value $I_2$, the power processing by NPB can also start decreasing; therefore, the NPB reference current value is reduced, according to range 502. The reduction of the NPB reference current continues until a value $I_1$. For values of current below $I_1$ and the unbalance being under boundaries, the NPB stops processing power, according to range 501.

FIG. 6 shows exemplary characteristics 600a, 600b, 600c for the DC capacitor currents of a power converter 110 as shown in FIG. 3a for illustration of a verification of the novel control method.

To validate the control method presented in this disclosure, simulations were carried on. The results of those simulations are shown in FIG. 6 where the action of the disclosed control method can be observed. The DC/AC multilevel converter in the simulations operates with discontinuous pulse width modulation (DPWM).

In the chart 600a, 600b, 600c shown in FIG. 6, the DC capacitor currents are shown, for the fast (film) 602 and slow (electrolytic) 601 capacitors as well as for the total DC-link 603. The charts 600a, 600b, 600c show that the reduction on the capacitor current stress is consistent along the power factor range. This is an important result because a uniform reduction of capacitor stress can be achieved, which enables a reduction of the amount of capacitors needed in the power converter and hence an increase of the power density.

FIG. 7 shows a schematic diagram of a method 700 for controlling a balancer circuit 130 according to the disclosure. The method 700 can be performed on the controller 200 described above with respect to FIGS. 1 and 2.

The method 700 comprises determining 701 a difference value 211 between a first DC link voltage 123 value across a first DC link 121 of a power converter 110 and a second DC link voltage value 124 across a second DC link 122 of the power converter 110, e.g., as described above with respect to FIGS. 1 and 2.

The method 700 comprises determining 702 a phase-angle 221 and a magnitude 222 of the difference value 211 for an integer harmonic of a predetermined grid frequency, e.g., as described above with respect to FIGS. 1 and 2.

The method 700 comprises providing 703 a switching signal 131 for switching between the first DC link 121 and the second DC link 122 based on the phase-angle 221 and the magnitude 222 in order to control a mid-point current 125 at a mid-point terminal 113 of the power converter 110 in terms of magnitude and direction based on the switching signal 131, e.g., as described above with respect to FIGS. 1 and 2.

The controller and control method as described in this disclosure can be applied to balance the partial DC-link voltages in multilevel converters for any application. In case the number of levels is more than three, the balancing circuit can be applied by pairs of DC-links. The solution can also be applied to any type of multilevel power converter that can suffer voltage unbalance at their multiple DC-links, e.g., DC-DC converters.

The disclosed controller and control method also brings special advantages in cases where DPWM is used. In case the DC-link has a split configuration with separate sets of capacitors absorbing the fast and slow components, the disclosed control method will present the larger benefit on the capacitors being circulated by the slow current components.

While a particular feature or aspect of the disclosure may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The terms "coupled" and "connected", along with derivatives may have been used. It should be understood that these terms may have been used to indicate that two elements cooperate or interact with each other regardless whether they are in direct physical or electrical contact, or they are not in direct contact with each other.

Although specific aspects have been illustrated and described herein, it will be appreciated by those of ordinary skill in the art that a variety of alternate and/or equivalent implementations may be substituted for the specific aspects shown and described without departing from the scope of the disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the disclosure beyond those described herein. While the disclosure has been described with reference to one or more particular embodiments, those skilled in the art recognize that many changes may be made thereto without departing from the scope of the disclosure. It is therefore to be understood that within the scope of the appended claims and their equivalents, the disclosure may be practiced otherwise than as specifically described herein.

What is claimed is:

1. A controller for controlling a balancer circuit, the controller being configured to:

determine a difference value between a first direct current (DC) link voltage value across a first DC link of a power converter and a second DC link voltage value across a second DC link of the power converter;

determine a phase-angle and a magnitude of the difference value for an integer harmonic of a predetermined grid frequency;

provide a switching signal for switching between the first DC link and the second DC link based on the phase-angle and the magnitude;

control a mid-point current at a mid-point terminal of the power converter in terms of magnitude and direction based on the switching signal; and determine a sign for the switching based on the phase-angle of the difference value, wherein the controller comprises a current control loop configured to control the mid-point current based on the sign and the magnitude of the difference value, wherein the controller is further configured to:
  determine a current control reference value for the current control loop based on the magnitude of the difference value and a measurement value of a converter current processed by the power converter;
  determine the current control reference value based on a linear relationship with the measurement value of the converter current within a predetermined range of the measurement value of the converter current; and
  set the current control reference value to a predefined value when the measurement value of the converter current is within a range above the predetermined range of the measurement value of the converter current, wherein the first DC link comprises a first DC link capacitor and the controller is configured to receive a measurement value of a voltage across the first DC link capacitor as the first DC link voltage value, wherein the second DC link comprises a second DC link capacitor and the controller is configured to receive a measurement value of a voltage across the second DC link capacitor as the second DC link voltage value, and wherein the balancer circuit comprises:
  a first switch configured to switch the first DC link of the power converter based on the switching signal; and
  a second switch configured to switch the second DC link of the power converter based on the switching signal.

2. The controller of claim 1,
wherein the controller is further configured to determine the phase-angle of the difference value based on a phase-lock-loop.

3. The controller of claim 1,
wherein controller is further configured to determine the phase-angle of the difference value based on a discrete Fourier transform calculation.

4. The controller of claim 3,
wherein the controller is further configured to determine the phase-angle of the difference value based on a real-time Discrete Fourier Transform calculation.

5. The controller of claim 1,
wherein the current control loop is configured to regulate an average value of the mid-point current.

6. The controller of claim 1,
wherein an output of the current control loop is configured to provide a switching reference value for the switching of the balancer circuit.

7. The controller of claim 1,
wherein the controller is further configured to instruct the balancer circuit to stop processing power, upon detecting that the measurement value of the converter current is within a range below the predetermined range of the measurement value of the converter current.

8. The controller of claim 1,
wherein the controller is further configured to determine the phase-angle and the magnitude of the difference value with respect to a reference frame.

9. The controller of claim 8,
wherein the reference frame is stored in a memory section comprising samples of a wave at the integer harmonic of the predetermined grid frequency.

10. The controller of claim 8,
wherein the reference frame is a predefined frame at three times a line frequency of the power converter.

11. The controller of claim 1,
wherein the predetermined grid frequency corresponds to a frequency of 50 Hz or 60 Hz, and/or
wherein the integer harmonic of the predetermined grid frequency corresponds to a third harmonic of the predetermined grid frequency.

12. The controller of claim 1,
wherein the power converter comprises a three-phase DC-AC converter for converting between DC power and three-phase alternating current (AC) power, based on a multilevel circuit topology.

13. The controller of claim 1,
wherein the power converter comprises a three-phase AC-DC converter for converting between three-phase AC power and DC power, based on a multilevel circuit topology.

14. The controller of claim 1, wherein the controller is further configured to:
receive the first DC link voltage value across the first DC link; and
receive the second DC link voltage value across the second DC link.

15. A method for controlling a balancer circuit using a controller, the method comprising:
determining a difference value between a first DC link voltage value across a first DC link of a power converter and a second DC link voltage value across a second DC link of the power converter;
determining a phase-angle and a magnitude of the difference value for an integer harmonic of a predetermined grid frequency;
providing a switching signal for switching between the first DC link and the second DC link based on the phase-angle and the magnitude in order to control a mid-point current at a mid-point terminal of the power converter in terms of magnitude and direction based on the switching signal; and
determining a sign for the switching based on the phase-angle of the difference value,
wherein the controller comprises a current control loop configured to control the mid-point current based on the sign and the magnitude of the difference value,
wherein the method further comprises:
  determining a current control reference value for the current control loop based on the magnitude of the difference value and a measurement value of a converter current processed by the power converter;
  determining the current control reference value based on a linear relationship with the measurement value of the converter current within a predetermined range of the measurement value of the converter current; and setting the current control reference value to a predefined value when the measurement value of the converter current is within a range above the predetermined range of the measurement value of the converter current, wherein the first DC link comprises a first DC link capacitor and the controller is configured to receive a measurement value of a voltage across the first DC link capacitor as the first DC link voltage value, wherein the second DC link comprises a second DC link capacitor and the controller is configured to receive a measurement value of a voltage across the second DC link capacitor as the second DC link voltage value, and wherein the balancer circuit comprises:
 a first switch configured to switch the first DC link of the power converter based on the switching signal; and
 a second switch configured to switch the second DC link of the power converter based on the switching signal.

* * * * *